United States Patent [19]

Gotou

[11] Patent Number: 4,491,770

[45] Date of Patent: Jan. 1, 1985

[54] BRUSHLESS DC MOTOR

[75] Inventor: Makoto Gotou, Nishinomiya, Japan

[73] Assignee: Matsushita Electric Industrial Co., Ltd., Kadoma, Japan

[21] Appl. No.: 409,103

[22] Filed: Aug. 18, 1982

[30] Foreign Application Priority Data

Aug. 20, 1981 [JP] Japan .................................. 56-131318

[51] Int. Cl.³ ............................ H02P 7/06; H02P 6/02
[52] U.S. Cl. ..................................... 318/254; 318/138; 318/439
[58] Field of Search ....................... 318/138, 254, 439; 307/31

[56] References Cited

U.S. PATENT DOCUMENTS

| | | | |
|---|---|---|---|
| 3,751,676 | 8/1973 | Igarshi | 307/31 |
| 3,911,338 | 10/1975 | Igarshi | 318/138 |
| 4,039,911 | 8/1977 | Tanikoshi | 318/138 X |
| 4,070,606 | 1/1978 | Morozumi | 318/138 X |
| 4,197,489 | 4/1980 | Dunn | 318/138 |
| 4,292,573 | 9/1981 | Ebert | 318/138 |
| 4,446,406 | 5/1984 | Uzuka | 318/138 X |

Primary Examiner—J. V. Truhe
Assistant Examiner—Patrick Keane
Attorney, Agent, or Firm—Wenderoth, Lind & Ponack

[57] ABSTRACT

In a brushless DC motor having a magnet (i.e.—a field flux generating means) and multiphase coils, a current is distributed from a DC voltage source to the multiphase coils by selectively activating a plurality of output transistors according to a set of output signals of a position detector. A distributor selectively activates the output transistors according to the output signals of the position detector. A command signal generator generates a command signal, and a low-pass filter is connected between the command signal generator and the distributor. A voltage detector detects voltage drops across the output transistors during each activated period and changes its output signal corresponding to the detected voltage drops when at least one of the voltage drops across the output transistors is smaller than a predetermined voltage. The input signal of the low-pass filter is corrected according to the output signal of the voltage detector, and the current supplied to the multiphase coils is decreased so as to prevent the output transistors from saturating. Thus, a current ripple which causes mechanical vibration and sounds can be effectively reduced.

4 Claims, 6 Drawing Figures

BRUSHLESS DC MOTOR

BACKGROUND OF THE INVENTION

1. Field of the Invention

This invention relates to a brushless DC motor having a magnet (i.e.—a field flux generating means) and multiphase coils, and more particularly to a brushless DC motor in which a current is distributed to the multiphase coils so as to be proportional to a reference signal.

2. Description of the Prior Art

In order to control the speed of a brushless DC motor (direct current motor), currents for a plurality of stator coils can be switched and controlled electronically, usually by transistors. A brushless DC motor, which has neither mechanical brushes nor commutators but has contactless electronic commutators such as transistors, has been designed and manufactured to produce a highly reliable motor. In a conventional brushless DC motor, the total armature current is usually controlled by a transistor connected in series with the armature, and the current path to a plurality of stator coils is switched by output transistors operated in then ON or OFF modes.

The output transistors can be used to control the magnitude of current in stator coils when operated in their non-saturating mode. The armature current is controlled indirectly by controlling the base currents of the output transistors. The current flowing through each stator coil varies depending upon $h_{FE}$ (forward current transfer ratio) of each output transistor. Therefore, it is inevitable that the total current flowing through the stator coils has ripples in the waveform thereof. An externally excited DC motor with a permanent magnet generates a torque which is essentially proportional to the armature current. Therefore, an unbalance or a difference in the $h_{FE}$ of the output transistors causes a ripple in the generated torque.

U.S. Pat. No. 3,751,676 discloses a brushless DC motor which overcomes the defects of the conventional motor described above. This brushless DC motor has a feedback loop wherein the total current flowing through the stator coils is controlled so as to be proportional to a reference signal irrespective of the unbalance and the variation in the $h_{FE}$ values of the output transistors. Thus, the torque ripple of the brushless DC motor due to the $h_{FE}$ unbalance has been significantly reduced. However, a current ripple occurs when the output transistor is saturated, as explained hereinbelow.

A speed controlled brushless DC motor supplies the stator coils with a large current during the starting and accelerating period because a quick response is desired. A alternating counter electromotive voltage, the magnitude of which is proportional to the rotational speed, is generated in each stator coil, and each of the voltage drops across the output transistors decreases according to the increase of the magnitude of each of the counter electromotive voltages. Therefore, the output transistors during each activated period are saturated during a transient period from starting to the desired rotational speed, and the actual supply current to the stator coils has a ripple because the required current corresponding to the reference signal cannot flow and the counter electromotive voltage varies during the activated period.

Furthermore, a spike of current flows to the stator coils by the operation of the feedback loop which activates two output transistors at the same time during a short period of the switching transition. These current ripples produce mechanical vibration and noise during the starting and accelerating period. This is a serious problem for a brushless DC motor used in audio or video equipment.

SUMMARY OF THE INVENTION

It is an object of this invention to provide a brushless DC motor which overcomes all of the abovesaid defects.

It is another object of this invention to provide a brushless DC motor which is applicable to audio or video equipment for rotating smoothly regardless of the speed of the motor.

These objects can be achieved by a brushless DC motor comprising: field flux generating means having a plurality of N and S poles; multiphase coils for generating a force by the interaction between a current flowing through said multiphase coils and the flux of said field flux generating means; a DC voltage source for providing electrical power; a plurality of output transistors for supplying electrical power to said multiphase coils from said DC voltage source; a command signal generating means for generating a command signal; a low-pass filter means for decreasing high frequency components in said command signal; a position detecting means for providing a set of output signals corresponding to the relative position between said field flux generating means and said multiphase coils; a distributing means for selectively activating said plurality of output transistors corresponding to the output signals of said position detecting means so as to supply said multiphase coils with a current according to the output signal of said low-pass filter means; a voltage detecting means for detecting voltage drops across said output transistors during each activated period and for changing an output signal corresponding to the detected voltage drops when at least one of the voltage drops across said output transistors during each activated period is smaller than a predetermined voltage; and a correcting means for correcting the input signal of said low-pass filter means corresponding to the output signal of said voltage detecting means.

These and other objects and features of this invention will become more apparent hereinafter from consideration of the detailed description together with the accompanying drawings.

DESCRIPTION OF THE PREFERRED EMBODIMENTS

Figure 1:
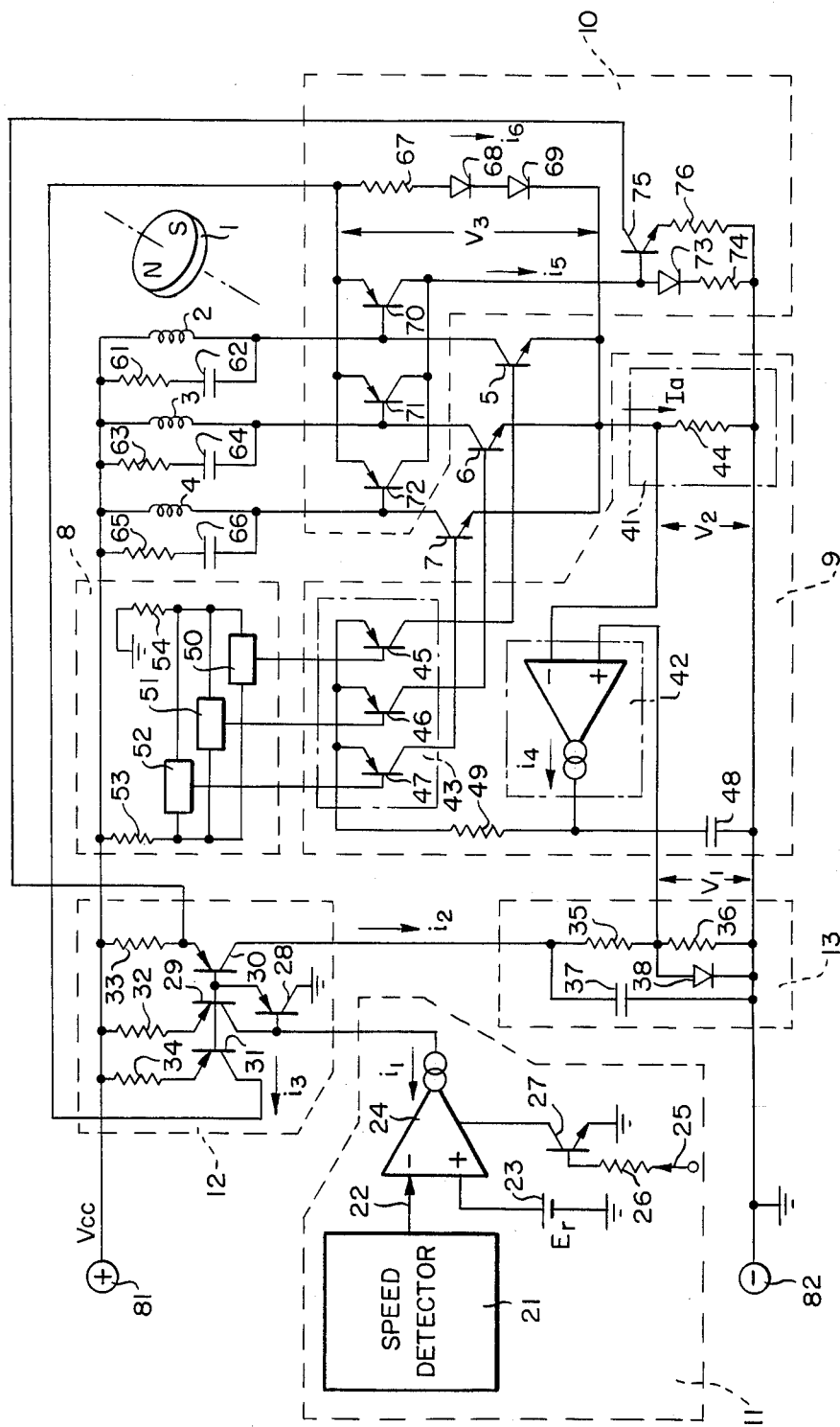
FIG. 1 is a circuit diagram of an embodiment of a brushless DC motor according to this invention.

Now, an embodiment of a brushless DC motor according to this invention will be described in detail by referring to FIG. 1. A magnet 1 (field flux generating means) is a multipole permanent magnet having a plurality of N and S poles. Three phase coils 2, 3 and 4 interlink the flux of the magnet 1 so that a current flowing through each coil 2, 3 or 4 generates a force (torque) by the interaction between its current and the flux of the magnet 1. The reference numerals 5, 6 and 7 are output transistors for changing a current path from a DC voltage source Vcc applied between terminals 81 and 82 to the three phase coils 2, 3 and 4. The reference numeral 8 enclosed by a broken line indicates a position detector having Hall elements 50, 51 and 52 for detecting the flux of the magnet 1 and producing three phase voltage signals. The reference numeral 9 indicates a distributor having a current detector 41, a current controller 42 and a selector 43. The reference numeral 10 indicates a voltage detector having a plurality of detecting transistors 70, 71 and 72 for detecting voltage drops across the output transistors 5, 6 and 7 during each activated period. The reference numeral 11 indicates a command signal generator having a speed detector 21 and a voltage-to-current converter 24 for generating a command signal $i_1$. The reference numeral 12 indicates a corrector formed by a current mirror circuit for producing current signals $i_2$ and $i_3$ corresponding to the command signal $i_1$ and an output signal $i_6$ of a voltage detector 10. The reference numeral 13 indicates a low-pass filter which converts an input current signal $i_2$ to an output voltage signal $V_1$ ($V_1$ is an input signal to the current controller 42 in the distributor 9).

Next, the operation of the brushless DC motor will be described. A DC voltage source (Vcc = 12 V) is applied between the terminals 81 and 82. The command signal generator 11 has a well known rotational speed detector 21 for producing a voltage signal 22 corresponding to the difference between the rotational speed of the magnet 1 and a desired speed. The voltage-to-current converter 24 compares the voltage signal 22 with a voltage Er of a voltage source 23, and the output current $i_1$ corresponding to the input voltage difference flows in from the corrector 12 when a motor stop signal 25 is a low voltage (0 V). The current $i_1$ becomes equal to zero when the motor stop signal 25 becomes a high voltage (5 V).

Figure 2:
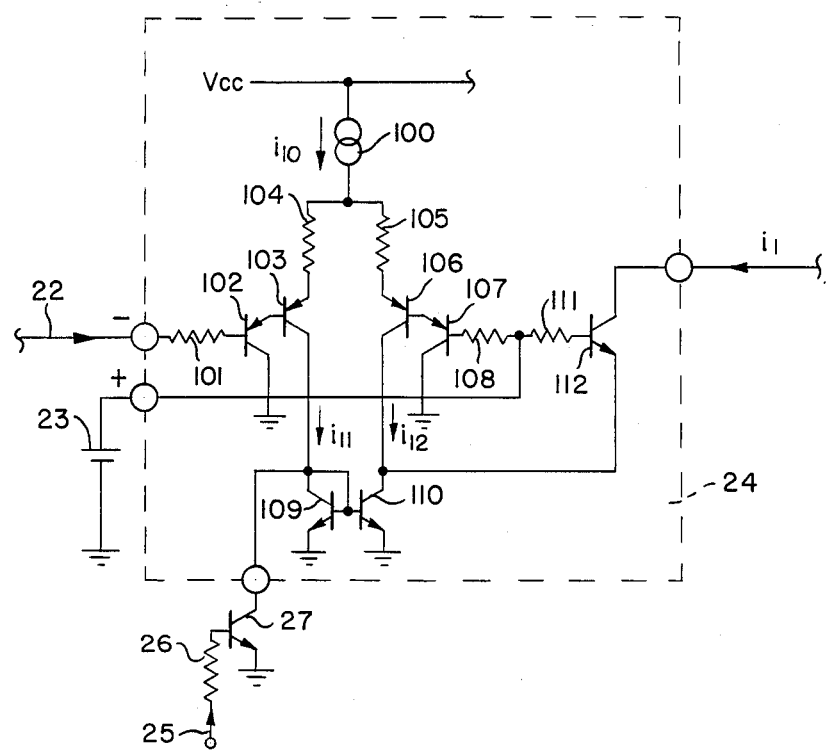
FIG. 2 is a circuit diagram of a voltage-to-current converter used in the embodiment shown in FIG. 1.

An embodiment of the voltage-to-current converter 24 is shown in FIG. 2. When the motor stop signal 25 is low, differential transistors 103 and 106 transform a current $i_{10}$ from a constant current source 100 into collector currents $i_{11}$ and $i_{12}$ corresponding to the difference between the voltage signal 22 and the voltage Er. Transistors 109 and 110 form a current mirror circuit (active loads to the differential transistors 103 and 106), so the difference current $(i_{11}-i_{12})$ is derived from a transistor 112 when $(i_{11}-i_{12}) \geq 0$. The current signal $i_1$, which is the command signal, is proportional to the current $(i_{11}-i_{12})$ corresponding to the difference between the voltage signal 22 and Er when $(i_{11}-i_{12}) \geq 0$. The current $i_1$ is zero when $(i_{11}-i_{12}) < 0$ (which is the case when the rotational speed of the magnet 1 is faster than the desired speed).

When the motor stop signal 25 becomes high, a transistor 27 becomes ON, and the output current $i_1$ is fixed to zero irrespective of the input voltage difference.

The command signal $i_1$ is supplied to the corrector 12 which is a current mirror circuit. Since the base-emitter voltage ($V_{BES}$) of transistors 29, 30 and 31 are equal or almost equal to each other, the voltage drops across resistors 32, 33 and 34 are equal or almost equal to each other. Thus, the output currents $i_2$ and $i_3$ of the corrector 12 are:

$$i_2 = i_1 - i_6 \geq 0 \quad (1)$$

$$i_3 = i_1 \geq 0 \quad (2)$$

when the values of the resistors 32, 33 and 34 are the same, where $i_6$ is the output current of the voltage detector 10.

The output current $i_2$ of the corrector 12 is supplied to the low-pass filter 13 which converts $i_2$ to the voltage signal $V_1$ supplied to the distributor 9. The transfer function of the low-pass filter 13 is:

$$G(j\omega) = V_1/i_2 = R_{36}/[1 + j\omega \cdot C_{37} \cdot (R_{35} + R_{36})] \quad (3)$$

where $R_{35}$, $R_{36}$ and $C_{37}$ are the values of resistors 35, 36 and the capacitor 37, respectively. Therefore, the low-pass filter 13 eliminates or decreases high frequency components in the current signal $i_2$ (which is a composite signal of the combination of the command signal $i_1$ and the output signal $i_6$ of the voltage detector 10). A diode 38 acts as a limiter of the output voltage $V_1$ of the low-pass filter 13.

The voltage $V_1$ is supplied to the non-inverting input of the current controller 42 in the distributor 9, and an output signal $V_2$ of the current detector 41 is supplied to the inverting input of the current controller 42. Thus, an output signal $i_4$ corresponds to the input voltage difference $(V_1 - V_2)$.

Figure 3:
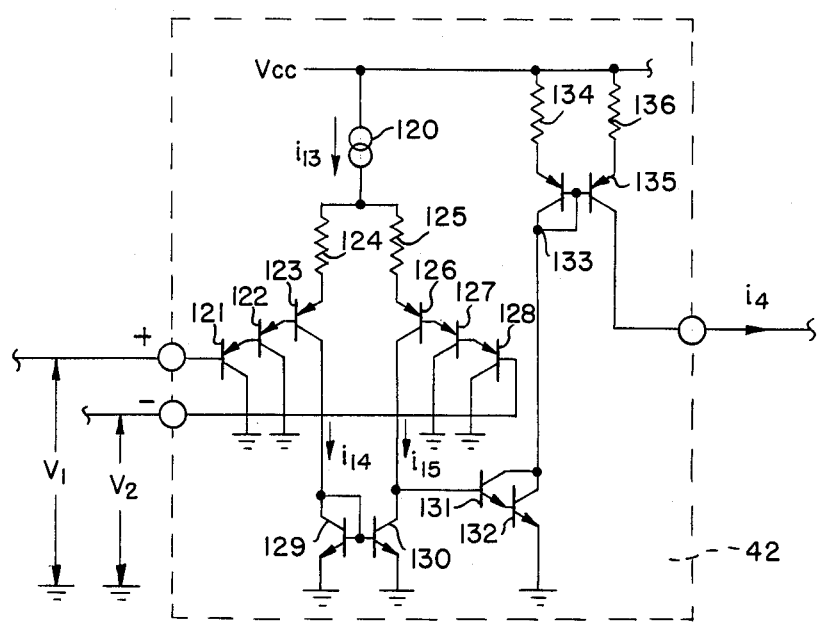
FIG. 3 is a circuit diagram of a current controller used in the embodiment shown in FIG. 1.

An embodiment of the current controller 42 is shown in FIG. 3. Differential transistors 123 and 126 transform a current $i_{13}$ from a constant current source 120 into collector currents $i_{14}$ and $i_{15}$ corresponding to the difference between $V_1$ and $V_2$. Transistors 129 and 130 form a current mirror circuit, so the difference current $(i_{15}-i_{14})$ is amplified by the transistors 131 and 132 when $(i_{15}-i_{14}) \geq 0$. Therefore, the output current $i_4$ of the current controller 42 corresponds to the input difference $(V_1-V_2)$ when $V_1 \geq V_2$. The current $i_4$ is zero when $V_1 < V_2$. The output current $i_4$ of the current controller 42 becomes the common emitter current of three differential transistors 45, 46 and 47 of the selector 43.

The Hall elements 50, 51 and 52 in the position detector 8 produce a set of three phase alternating voltages having similar magnitudes of about 0.3 $V_{pp}$, and the output voltages of the Hall elements 50, 51 and 52 are respectively supplied to the bases of the differential transistors 45, 46 and 47 in the selector 43. The common emitter current $i_4$ is divided into the collector currents of the transistors 50, 51 and 52 according to the voltage differences with respect to the output voltages of the Hall elements 50, 51 and 52. As the result of this, the collector current of the transistor having the smallest base voltage has the largest value, and collector currents of the rest of the transistors have relatively much smaller values (almost zero).

The activated transistor in the selector 43 changes smoothly according to the rotation of the magnet 1, because the output voltages of the Hall elements 50, 51 and 52 change smoothly in the fashion of three phase sinewaves. Each collector current of the transistors 45, 46 and 47 in the selector 43 respectively becomes each base current of the output transistors 5, 6 and 7. Thus, the output transistors 5, 6 and 7 are selectively activated by the selector 43 according to the output signals of the position detector 8, and supply a current to the three phase coils 2, 3 and 4. The current detector 41 detects the total current flowing through the three phase coils 2, 3 and 4, and provides the detected signal $V_2$ which is supplied to the inverting input of the current controller 42.

Therefore, the feedback loop (i.e—the first feedback loop) is formed by the current controller 42, the selector 43, the output transistors 5, 6 and 7, and the current detector 41, and controls the current to the three phase coils 2, 3 and 4 according to the output signal $V_1$ of the low-pass filter 13 which changes in correspondence with the command signal $i_1$ of the command signal generator 11 and the output signal $i_6$ of the voltage detector 10, so that it is constant irrespective of an unbalance and a variation of the $h_{FE}$ values of the output transistors 5, 6 and 7.

Three pairs of serial circuits of resistors 61, 63 65 and capacitors 62, 64, 66 are respectively connected in parallel to the three phase coils 2, 3 and 4 so as to reduce voltage spikes during switching periods. A capacitor 48 compensates the phase of the first feedback loop so as to prevent any oscillation in the loop.

Since the detected signal $V_2$ is the voltage drop across a resistor 44 and $V_2 = V_1$ by the operation of the first feedback loop, a current $I_a$ to the three phase coils 2, 3 and 4 is:

$$I_a = V_1/R_{44} \tag{4}$$

where $R_{44}$ is the value of the resistor 44. That is, the current $I_a$ to the three phase coils 2, 3 and 4 is proportional to the input voltage $V_1$ of the distributor 9. When the voltage drop across the activator transistor is not smaller than a predetermined voltage, the output current $i_6$ is zero (this is explained later). In such a case, the current $I_a$ is:

$$I_a = (1/R_{44}) \cdot G(j\omega) \cdot i_1 \tag{5}$$

That is, the first feedback loop operates properly so as to supply the three phase coils 2, 3 and 4 with a constant current corresponding to the command signal $i_1$ of the command signal generator 11. Thus, the rotational speed of the magnet 1 is well controlled.

In the conventional brushless DC motor shown in U.S. Pat. No. 3,751,676, which does not have the voltage detector, the output transistors are saturated during a transient response from starting to the desired rotational speed, due to the counter electro-motive voltages. A severe current ripple of the current to the coils occurs during the transient time which is caused by the first feedback loop, because the activated output transistor cannot supply enough current so as to have a current corresponding to the command signal. Thus, the actual current is much smaller than the commanded value, and two output transistors become ON during a short period during switching so that the actual current becomes equal to the commanded value. This current ripple causes a harmful mechanical vibration and noise.

Therefore, it is an essential problem to avoid such a current ripple, and the brushless DC motor according to this invention shown in FIG. 1 has the voltage detector 10, the operation of which is explained hereinbelow.

The current $i_3$ of the corrector 12 which is proportional to the command signal $i_1$ is supplied to a resistor 67, diodes 68 and 69 in the voltage detector 10 when the currents to the detecting transistors 70, 71 and 72 are zero, and it produces a voltage:

$$V_{3r} = 1.4 + R_{67} \cdot i_3 \tag{6}$$

from the common terminals (emitters) of the output transistors 5, 6 and 7, where 1.4 V is the voltage drop across the silicon diodes 68 and 69, and $R_{67}$ is the value of the resistor 67. Each of the emitters of the detecting transistors 70, 71 and 72 is connected to the point of a voltage $V_{3r}$ directly (or through a resistor or a diode), and each of the bases of the detecting transistors 70, 71 and 72 is respectively connected to the output terminals of the output transistors 5, 6 and 7 directly (or through a resistor or a diode).

Figure 4:
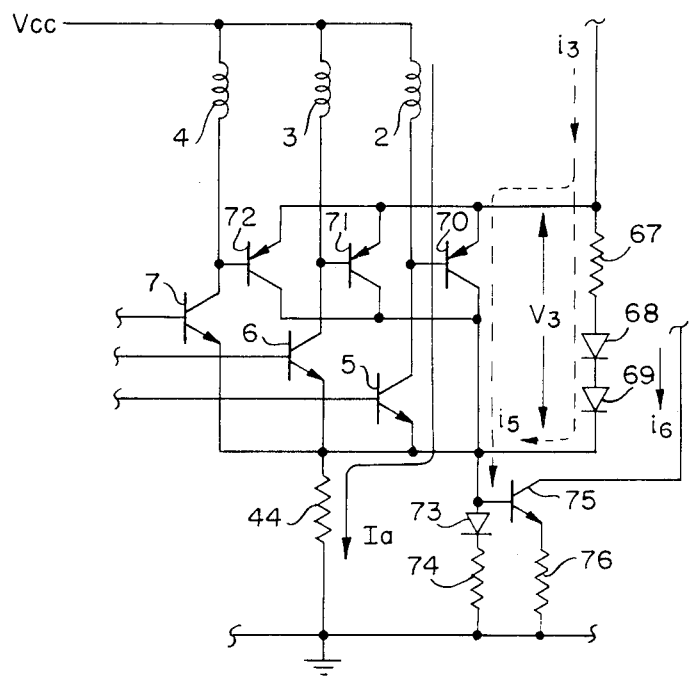
FIG. 4 is a circuit diagram for explaining an operation of the embodiment of FIG. 1.

FIG. 4 shows a current path of $I_a$ when the output transistor 5 is activated, and the current path the positive terminal of the DC voltage source Vcc→coil 2→output transistor 5→negative terminal of the DC voltage source. The voltage drop across the activated output transistor 5 (i.e.—the absolute value of the voltage between collector and emitter $|V_{CE}|$) is smaller than that across any other output transistor 6 or 7. Thus, the detecting transistors 70, 71 and 72 compare the voltage drops across the output transistors 5, 6 and 7 in each activated period with a predetermined voltage, and a detected current $i_5$ is supplied to a current mirror circuit formed by a diode 73, a transistor 75, and resistors 74 and 76 when a voltage drop across an output transistor in its activated period becomes smaller than the predetermined value: $(V_{3r} - 0.7) = 0.7 + R_{67} \cdot i_3$, where 0.7 V is the absolute value of the forward voltage drop between emitter and base of the corresponding detecting transistor.

In FIG. 4, $i_5$ and $V_3$ are:

$$i_5 = (1/R_{67}) \cdot (V_{3r} - 0.7 - |V_{CE}|) \tag{7}$$

$$V_3 = V_{3r} - R_{67} \cdot i_5 \tag{8}$$

when $|V_{CE}|$ is smaller than $(V_{3r} - 0.7)$ (that is, $i_5 \geq 0$).

The detected current $i_5$ is converted to the output signal $i_6$ by being amplified and having its polarity inverted by the current mirror. Thus, the output signal $i_6$ of the voltage detector 10 is zero when each of the voltage drops across the output transistors 5, 6 and 7 during each activated period is not less than the predetermined small voltage $(V_{3r} - 0.7)$, and the output signal $i_6$ changes corresponding to the voltage difference $(V_{3r} - 0.7 - |V_{CE}|)$ when at least one of the voltage drops across the output transistors 5, 6 and 7 during each activated period becomes smaller than the voltage $(V_{3r} - 0.7)$.

The output signal $i_6$ of the voltage detector 10 is supplied to the corrector 12, and corrects or decreases the input signal $i_2$ of the low-path filter 13 so as to correct or decrease the input signal $V_1$ of the distributor 9. The decrease of the input signal $V_1$ decreases the current $I_a$ to the three phase coils by the operation of the first feedback loop, which increases the voltage drop across the activated output transistor. Therefore, another feedback loop (i.e.—the second feedback loop) is formed by the voltage detector 10, the corrector 12, the low-pass filter 13 and the first feedback loop, and the second feedback loop controls the voltage drop across the activated output transistor so that the activated transistor does not saturate.

Figure 5:
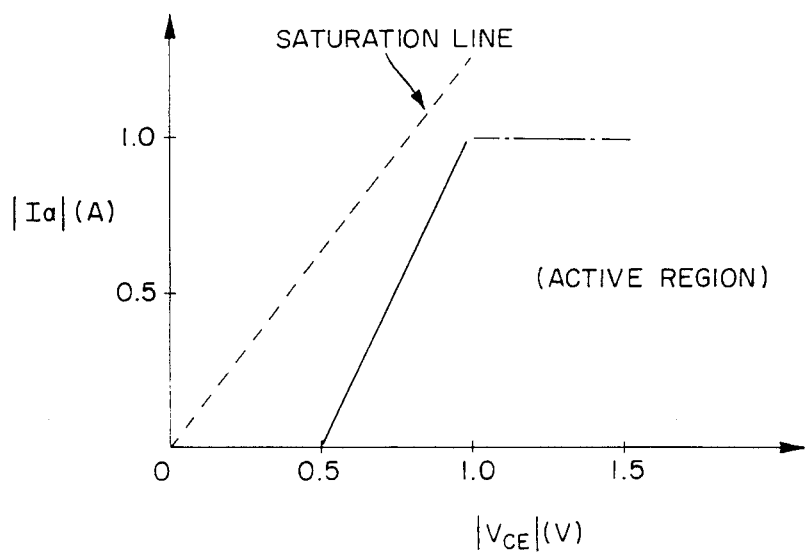
FIG. 5 is a graph for explaining an operation of the embodiment of FIG. 1.

The characteristic curve of voltage drop $|V_{CE}|$ vs. current $|I_a|$ due to the operation of the second feedback loop is shown in FIG. 5 (the solid line), and it is in the active region of the transistor (below the saturation line). Thus, the current ripple due to the first feedback loop in the conventional brushless DC motor cannot occur because of the operation of the second feedback loop.

Furthermore, since the low-pass filter 13 eliminates or decreases ripple (high frequency components) in the output signal $i_2$ of the corrector 12, current ripples due to ripples in the command signal $i_1$ of the command signal generator 11 and ripples in the output signal $i_6$ of the voltage detector 10 are also reduced. Thus, the current ripples of $I_a$ of the brushless DC motor according to this invention are significantly reduced.

Assuming that said predetermined voltage ($V_{3r}-0.7$) is designed to be 1 V at the maximum of the command signal $i_1$, the detecting transistors 70, 71 and 72 are all OFF ($i_5=0$) when the voltage drop across the activated output transistor is larger than 1 V, and the second feedback loop does not have any effect on the current Ia. The current Ia to the three phase coils 2, 3 and 4 then corresponds only to the command signal $i_1$ of the command signal generator 11, and the rotational speed of the magnet 1 is controlled so as to be at a desired value with good stability.

The low-pass filter 13 compensates the phase of the second feedback loop so as to prevent any oscillation in the loop, because it has a gain vs. frequency characteristic of −6 dB/oct in the frequency range above a predetermined frequency $f_1 = \frac{1}{2}C_{37}(R_{35}+R_{36})$ (considering the equation (3)). Furthermore, the low-pass filter 13 has an effect to prevent a step or rapid change of the current Ia to the three phase coils 2, 3 and 4 when the motor stop signal 25 changes from 0 V to 5 V or from 5 V to 0 V, and this is explained hereinbelow.

Considering the case when the motor stop signal 25 changes from 0 V to 5 V when the command signal $i_1$ is so large that the current Ia is at a maximum, then the command signal $i_1$ of the command signal generator 11 quickly becomes equal to zero. Assuming that the capacitor 37 is removed, then the quick change of $i_1$ produces a quick change of $V_1$, and this produces a quick change of Ia. The quick change of Ia from the maximum to zero induces a large voltage spike in a corresponding coil so as to prevent the rapid change of the current Ia due to the inductance of the coil. The voltage spike is so large that the serial circuit of the resistor and the capacitor connected in parallel to the coil cannot reduce it significantly. As the result of this voltage spike, the output transistor will be damaged or reduced in its life time. The quick change of Ia, however, cannot occur in the brushless DC motor shown in FIG. 1, because the capacitor 37 in the low-pass filter 13 changes $V_1$ moderately even when the command signal $i_1$ changes with a step function. The moderate change of $V_1$ makes a moderate change of Ia, which induces a significantly reduced voltage spike in the corresponding coil. Thus, the output transistor 5, 6 or 7 is not damaged when the motor stop signal 25 changes from 0 V to 5 V or from 5 V to 0 V.

Figure 6:
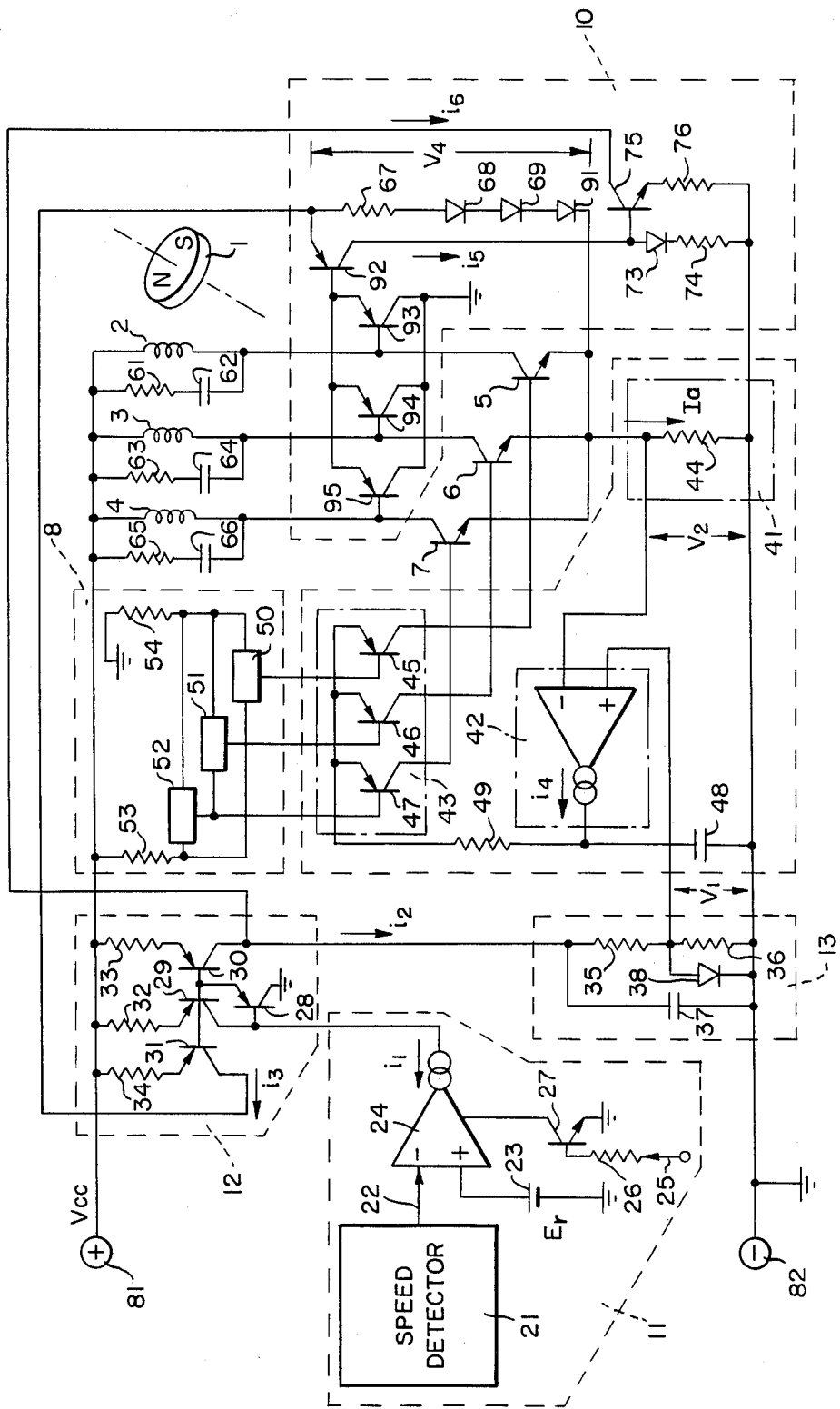
FIG. 6 is a circuit diagram of another embodiment of a brushless DC motor according to this invention.

FIG. 6 shows another embodiment of the brushless DC motor according to this invention. The construction of this embodiment is the same as that of the embodiment of FIG. 1 except with respect to the voltage detector 10 and the corrector 12. Almost all of the components are the same as those in FIG. 1, so the reference numerals are the same. In FIG. 6, the output current $i_3$ of the corrector 12 is supplied to the resistor 67 and the diodes 68, 69 and a diode 91 in the voltage detector 10 so that a voltage $V_{4r}=2.1+R_{67}\cdot i_3$ is generated when a current $i_5$ to a comparing transistor 92 is zero. Each of the emitters of detecting transistors 93, 94 and 95 is connected to the base of the comparing transistor 92, each of the collectors of the detecting transistors 93, 94 and 95 is connected to the point of the lowest potential (i.e.—the negative terminal of the DC voltage source), and each of the bases of the detecting transistors 93, 94 and 95 is connected to each of the output terminals of the output transistors 5, 6 and 7.

The emitter of the comparing transistor 92 is connected to the point of the voltage $V_{4r}$, and the comparing transistor 92 compares the voltage drops across the output transistors 5, 6 and 7 during each activated period with a predetermined voltage. The detected signal $i_5$ of the comparing transistor 92 corresponds to the voltage difference ($V_{4r}-1.4-|V_{CE}|$), and $i_5$ is converted to the output signal $i_6$ of the voltage detector 10 by being amplified and having its polarity inverted by the current mirror (the diode 73, the transistor 75, the resistors 74, 76). The output $i_6$ is supplied to the collector of the transistor 30 in the corrector 12, and the output signal $i_2$ of the corrector 12 is ($i_1-i_6$). The operation of this embodiment is the same or similar to the operation of the embodiment of FIG. 1 described hereinbefore, and thus the explanation thereof is omitted.

Since the detecting transistors of the voltage detector 10 in the embodiments of FIG. 1 and FIG. 6 are all bipolar PNP type transistors, transistors with a lateral PNP structure are used for the detecting transistors 70, 71 and 72 in the embodiment of FIG. 1, and transistors with a substrate PNP structure are used for the detecting transistors 93, 94 and 95 in the embodiment of FIG. 6. Because the reverse breakdown voltage between the base and emitter and the breakdown voltage between the base and collector are both large in such PNP transistors with a lateral PNP structure or with a substrate PNP structure, compared with an NPN transistor or a PNP transistor having a vertical PNP structure, a voltage breakdown rarely occurs due to the voltage spikes induced in the three phase coils 2, 3 and 4 during the switching periods. These PNP transistors with the lateral PNP structure or with the substrate PNP structure are easily obtained by integrated circuit technology, and the circuit shown in FIG. 1 or FIG. 6 is particularly suitable to be constructed by one chip integrated circuit with some external components. The detecting transistors are also integrated in the one chip integrated circuit.

The predetermined voltage of the voltage detector 10 is:

$$V_{3r}-0.7=0.7+R_{67}\cdot i_3 \text{ in FIG. 1}$$

or $$V_{4r}-1.4=0.7+R_{67}\cdot i_3 \text{ in FIG. 6.}$$

Since $i_2$ and $i_3$ changes according to the command signal $i_1$ (when $i_6=0$), and as the current Ia changes according to $i_2$, the predetermined voltage changes in correspondence with Ia. That is, the predetermined voltage is large when Ia is large, and the predetermined voltage is small when Ia is small. This compensates for the saturation characteristic of the output transistor (see the saturation line in FIG. 5), and ensures the detection of the voltage detector 10 regardless of the value of Ia, and minimizes the operating range of the second feedback loop corresponding to the current Ia.

In the foregoing embodiments, bipolar transistors are used for the output transistors 5, 6 and 7. However, field effect transistors may also be used for the output transistors, because the characteristic of $V_{DS}$ vs. $I_D$ ($V_{DS}$: drain-source voltage, $I_D$: drain current) of a field effect transistor is similar to the characteristic of $V_{CE}$ vs. $I_C$ of a bipolar transistor. As is well-known in the art, the output current $I_D$ is controlled by the gate voltage. Thus, the drain, source and gate of the field effect transistor correspond to the output, input and control terminals of the output transistor, respectively. (The collector, emitter and base of the bipolar transistor correspond to the output, input and control terminals of the output transistor, respectively, in the embodiments of FIG. 1 and FIG. 6.)

Although the description of the embodiments is directed to a brushless DC motor having three phase coils, it should be understood that this invention achieves a brushless DC motor having any phase coils. This invention is applicable not only to a rotational type brushless DC motor but also to a linear type brushless DC motor.

Furthermore, this invention is also applicable to a brushless DC motor for supplying a current to multiphase coils bidirectionally (for example, the brushless DC motor in the U.S. Pat. No. 4,035,700).

What is claimed is:

1. A voltage detecting means for a brushless DC motor having a plurality of output transistors having output terminals for changing a current path from a DC voltage source to at least two multiphase coils according to the relative rotation between a field flux generating means and said multiphase coils, wherein said voltage detecting means has a plurality of detecting transistors each having base and emitter terminals, said base terminals of said plurality of detecting transistors being respectively directly connected to said output terminals of said plurality of output transistors, and said emitter terminals of said plurality of detecting transistors being connected in common, and wherein said plurality of detecting transistors are bipolar PNP type transistors having one of either a lateral PNP structure or a substrate PNP structure.

2. A brushless DC motor comprising:
a field flux generating means having a plurality of N and S poles for generating a field flux;
at least two multiphase coils for generating a force by the interaction between a current flowing through said multiphase coils and said flux of said field flux generating means;
a DC voltage source for providing electrical power;
a plurality of output transistors having control terminals, said plurality of output transistors supplying electrical power to said multiphase coils from said DC voltage source;
a command signal generating means having a speed detecting means for generating a command signal;
a position detecting means for providing a set of output signals corresponding to the relative position between said field flux generating means and said multiphase coils;
a distributing means including: a current detecting means for detecting the total current to said multiphase coils and for providing an output corresponding thereto, a current controlling means for providing an output from an output terminal corresponding to the difference between said output of said current detecting means and an input signal corresponding to said command signal, and a selecting means for selecting a current path from said output terminal of said current controlling means to said control terminals of said plurality of output transistors according to said output signals from said position detecting means;
a voltage detecting means for detecting voltage drops across said plurality of output transistors during each activated period and for changing an output signal corresponding to said detected voltage drops when at least one of said voltage drops across said plurality of output transistors during each activated period is smaller than a predetermined voltage;
a correcting means for producing a composite signal corresponding to the combination of said command signal of said command signal generating means and said output signal of said voltage detecting means; and
a low-pass filter means having an output and operatively connected between said correcting means and said distributing means for producing an input signal for said distributing means by decreasing high frequency components of said composite signal of said correcting means;
wherein said current detecting means, said current controlling means, said selecting means and said plurality of output transistors form a first feedback loop so as to supply said multiphase coils with a current which is proportional to said output of said low-pass filter means; and
said voltage detecting means, said correcting means, said low-pass filter means and said first feedback loop form a second feedback loop so as to decrease said current to said multiphase coils from a value corresponding to said command signal from said command signal generating means when said voltage drops across said plurality of output transistors during each activated period become smaller than said predetermined voltage;
wherein said voltage detecting means has a plurality of detecting transistors, each having base and emitter terminals, said base terminals of said plurality of detecting transistors being respectively directly connected to output terminals of said plurality of output transistors, and said emitter terminals of said plurality of detecting transistors being connected in common, and wherein said plurality of detecting transistors are bipolar PNP type transistors having one of either a lateral PNP structure or a substrate PNP structure.

3. A brushless DC motor as claimed in claim 2, wherein said voltage detecting means has a voltage generating means for providing said predetermined voltage which changes in correspondence with said command signal.

4. A brushless DC motor as claimed in claim 2, wherein said command signal generating means has a motor stop means which controls said command signal so as to cut off said current supplied to said multiphase coils.

* * * * *